Patented Sept. 9, 1952

2,610,179

UNITED STATES PATENT OFFICE 2,610,179

PHOSPHORYLATION OF RIBOFLAVIN

Leo A. Flexser, Upper Montclair, and Walter G. Farkas, Nutley, N. J., assignors to Hoffmann-La Roche Inc., Nutley, N. J.

No Drawing. Application September 28, 1951, Serial No. 248,869

18 Claims. (Cl. 260—211.5)

This invention is concerned with the novel preparation of a physiologically active monophosphoric acid ester of riboflavin. This ester, especially in the form of its salts, e. g., its sodium salt, has the very desirable property of being much more soluble than riboflavin itself and is, therefore, of great utility for the preparation of solutions of riboflavin suitable for injection or incorporation into foods. Unlike riboflavin esters of organic acids, our monophosphoric acid ester also has the great advantage of being strongly resistant to hydrolysis over a wide range of pH. Our invention also embraces new intermediates for producing that ester.

This application is a continuation-in-part of our application S. N. 141,585, filed January 31, 1950.

R. Kuhn and his co-workers (Ber. 69, 1543, 1974 (1936); U. S. Pat. 2,111,491) reported the preparation of a riboflavin phosphoric acid ester but did not state the melting point or optical rotation of their product. P. Karrer and his co-workers (Helv. Chim. Acta 20, 79 (1937)), attempting to repeat the work of Kuhn et al. stated the following (p. 81): "We have tried dozens of experiments but did not succeed thus far in obtaining pure synthetic lactoflavin (riboflavin) phosphoric acid. On the contrary, the composition of the preparations was always variable and did not conform to that of a simple calcium salt of lactoflavin phosphoric acid. It may be assumed that the authors quoted (Kuhn et al.) encountered similar difficulties since they do not publish analytical figures about their preparation (whereas they do so for their phosphorus-free intermediate products)."

The process set forth in the above mentioned Kuhn patent is represented in that patent to involve a reaction between riboflavin and phosphorus oxychloride. The purported reaction is stated to take place in the presence of an organic base and, more particularly, in the presence of pyridine. The use of phosphorus oxyhalide, as set forth in that patent, has, however, not proven successful, as note the observations of P. Karrer and his co-workers, supra. We have repeated the Kuhn process using the specific phosphorus oxyhalide mentioned in the patent, namely, phosphorus oxychloride, in the presence of pyridine, and have not been able to establish the synthesis of the desired monophosphoric acid ester of riboflavin by that process. As will be shown hereinafter, our process involves a distinct departure from the Kuhn process in that we do not employ a phosphorus oxyhalide, but on the contrary, we use certain mono- and di-halophosphoric acids, namely, mono- and di-chlorophosphoric acids, mono- and di-bromophosphoric acids, and mono- and di-fluorophosphoric acids.

Our novel process for phosphorylating riboflavin, in contradistinction to that of Kuhn et al., offers no difficulties and produces a readily isolable riboflavin monophosphoric acid ester in good yield. A further advantage of our invention is that no base, such as pyridine, is required to catalyze the phosphorylation, as is used by Kuhn et al., nor is it necessary to maintain rigidly anhydrous conditions usually needed with a $POCl_3$-pyridine phosphorylating mixture.

Our process comprises reacting riboflavin with a halophosphoric acid represented by the formulae $(HO)_2POX$ and $HOPOX_2$, wherein X is a halogen selected from the group consisting of chlorine, bromine and fluorine. When several volumes of an anhydrous ether, e. g., ethyl ether or isopropyl ether, are added to the solution obtained after reaction of riboflavin with a halophosphoric acid, according to our invention, a solid is precipitated which may be filtered, washed with the ether and dried.

Preferably the reaction is carried out with a great excess of phosphorylating agent and for a sufficient length of time to insure that no riboflavin remains unphosphorylated. The products which are thereupon obtained contain phosphorus and a halogen. The extent of the phosphorylation depends on the length of time the riboflavin is allowed to react with the halophosporic acids. The extent of phosphorylation is immaterial, as in all cases the phosphorylated products, upon hydrolysis, yield riboflavin monophosphoric acid ester as a final product. While the main product is riboflaxin-5'-monophosphoric acid ester, a minor portion of riboflavin (2'), (3'), or (4') monophosphoric acid ester may also be formed.

It is to be understood that we do not wish to limit ourselves by any theoretical interpretation of the formation of our new riboflavin compounds containing phosphorus and a halogen. The reaction involves formation of halogen-containing phosphorylated products. However, we do not wish to limit our invention to any specific theory of reaction or structure of products. While the aforementioned phosphorylated halogen-containing intermediates may be isolated, e. g., by precipitation with ether, it is not necessary to effect such isolation for the preparation of riboflavin monophosphoric acid ester. In the latter instance, the reaction mixture after phosphorylation of the riboflavin by the halophosphoric acid is simply added to several volumes of cold water or ice and allowed to stand for several hours. During this time the residual, unreacted halophosphoric acid is completely hydrolyzed to phosphoric and hydrohalic acids and the halogen- and phosphorus-containing riboflavin ester products undergo hydrolysis to stable riboflavin monophosphoric acid ester. The latter substance is then readily isolated from the solution, e. g., by crystallization.

The halophosphoric acids may be prepared by treating a phosphorus oxyhalide ($POX_3$), wherein X stands for chlorine, bromine, or fluorine, with water. Riboflavin is soluble in and is readily phosphorylated by these agents at room temperature.

The formation of the monohalophosphoric acids and dihalophosphoric acids used in our process is shown hereinafter as occurring by reaction between phosphorus oxyhalide and water. We prefer to employ about 1 to 2 moles of water per mole of phosphorus oxyhalide. The treatment of phosphorus oxyhalide with water follows the course:

$$POX_3 + H_2O \rightarrow HOPOX_2 + HX$$
$$POX_3 + 2H_2O \rightarrow (HO)_2POX + 2HX$$

X representing chlorine, bromine or fluorine. The fluorophosphoric acids can also be prepared by the method of U. S. Patent No. 2,423,895. The analogous chloro and bromo acids can similarly be prepared by this method. The chlorophosphoric, bromophosphoric and fluorophosphoric acids can, of course, be formed in the presence of riboflavin and thus react directly with the riboflavin.

The following examples are illustrative of our novel method of preparing riboflavin monophosphoric acid ester and the new intermediate products. It is intended that these illustrations not be restrictive of the scope of our invention.

EXAMPLE 1

To 61.3 g. of phosphorus oxychloride (0.4 mole) were added slowly, with good agitation and with cooling to about room temperature, 7.2 g. (0.4 mole) of water. The mixture was stirred until evolution of hydrogen chloride gas appeared mostly finished and allowed to stand overnight. The mixture was then cooled to 5° C. and 3.76 g. riboflavin added with stirring. Complete solution took place quickly and HCl was evolved. The solution was kept at 5° C. for 1½ hours and then at room temperature for 3½ hours. The solution was added slowly and with stirring to about 500 cc. anhydrous ethyl ether. The yellow precipitate which formed was filtered off, washed thoroughly with ether and dried in vacuo. Weight=5.5 g. Analysis showed a content of 2.4 atoms phosphorus per molecule. The substance was hygroscopic and smelled of HCl. It decomposed at about 150° C.

EXAMPLE 2

The product of Example 1 was hydrolyzed by adding it to 100 cc. of water. A clear amber solution was obtained from which riboflavin monophosphoric acid ester crystallized in hexagonal plates. The mixture was allowed to stand overnight to complete the crystallization. It was then filtered, washed with alcohol and ether and dried. The yellow product melted at about 195° C. and analyzed correctly for the monophosphoric acid ester of riboflavin corresponding to the formula $C_{17}H_{19}N_4O_6PO_3H_2$. The optical rotation of a 2 percent solution in concentrated hydrochloric acid was $[\alpha]_D^{28°} = +44.5°$. On potentiometric titration with sodium hydroxide, a well-defined point of inflection in the titration curve was obtained at pH 4.5 upon the addition of exactly one equivalent of alkali. A second inflection point at pH 8.5 was obtained upon the addition of a second equivalent of alkali. The substance resembled riboflavin in appearance, had biological activity, but was easily distinguishable by its greater water solubility, the fact that it gelled somewhat upon addition to water, and by its formation of highly water-soluble salts with alkali hydroxides, ammonia, diethanolamine and the like.

EXAMPLE 3

14.4 g. (0.8 mole) of water were added to 61.3 g. (0.4 mole) of phosphorus oxychloride as in Example 1 and the mixture allowed to stand overnight. 3.76 g. riboflavin were added with stirring, rapid solution being obtained with evolution of HCl gas. The solution was allowed to stand at room temperature for 65 hours and then slowly added to 500 cc. anhydrous ether. A redbrown precipitate was obtained which was filtered, washed with ether and dried in vacuo. The product weighed 6.2 g., indicating greater polyphosphorylation than in Example 1. This product was added to 62 cc. of dioxane containing 6 cc. of water. Solution took place, followed by crystallization of riboflavin monophosphoric acid ester. The latter substance was filtered the following day, washed with dioxane and ether and dried. Its properties were similar to those of the product of Example 2.

EXAMPLE 4

3.76 g. riboflavin were reacted with 61.3 g. phosphorus oxychloride pretreated with 7.2 g. water exactly as in Example 1. The reaction solution then was poured into a mixture of 200 g. ice and 200 g. water and allowed to stand overnight. Riboflavin monophosphoric acid ester crystallized. It was filtered off, washed with 3 N hydrochloric acid, alcohol, ether and dried. The product was similar to that of Example 2.

EXAMPLE 5

To 63.5 g. (40 cc.) of difluorophosphoric acid [$HOPOF_2$] were added 7.52 g. of riboflavin with stirring and cooling to about room temperature. The riboflavin went slowly into solution, and a pasty yellow precipitate appeared after 20 minutes. Another 25 cc. of difluorophosphoric acid were added and stirring was continued for 2½ hours at room temperature. The viscous slurry was then cooled in an ice bath and 400 cc. of anhydrous ethyl ether were added. The resulting yellow precipitate was filtered off, washed thoroughly with ether and dried in vacuo at room temperature. It weighed 9.0 g. The product was hydrolyzed by dissolving 6 g. in 10 cc. of concentrated hydrochloric acid and adding 90 cc. of water to the clear solution. The monophosphoric acid ester of riboflavin began to crystallize. After standing for two hours, the crystals were filtered off, washed with 30 cc. of normal hydrochloric acid, alcohol and ether and dried.

EXAMPLE 6

7.52 g. (0.02 mole) of riboflavin were added with stirring to 40 cc. of monofluorophosphoric acid [$(HO)_2POF$] and the reaction mixture was cooled in a water bath to room temperature. Complete solution was obtained in about five minutes. After 30 minutes a yellow precipitate formed. After 90 minutes total reaction time, 500 cc. of isopropyl ether were added slowly with cooling to about room temperature. The resulting precipitate was filtered, washed well with isopropyl ether and dried in vacuo. The resulting product weighed 10 g. The dried precipitate was dissolved in 15 cc. of concentrated hydrochloric acid and 90 cc. of water were added to the solution. Riboflavin monophosphoric acid ester crystallized. After standing for about 20 hours, the crystals were filtered, washed with 30 cc. of normal hydrochloric acid and then with alcohol and ether, and dried.

EXAMPLE 7

To 114.5 g. (0.4 mole) of phosphorus oxybromide crystals, 7.2 cc. (0.4 mole) of water were slowly added with stirring and cooling to about room temperature. Hydrogen bromide was evolved and solution was obtained after about 30 minutes. Stirring was continued for another hour and the solution was then allowed to stand for about 16 hours. There were then added 7.52 g. of riboflavin with stirring. Hydrogen bromide was evolved and a solution was rapidly obtained. The reaction was allowed to proceed for 30 minutes, the solution was then cooled to about 5° C. by means of an ice bath, and 600 cc. of anhydrous ether were added. The brownish precipitate which formed was filtered off, washed well with ether and dried in vacuo at room temperature. The product weighed 12.45 g. Eight grams of the product were dissolved in 15 cc. of concentrated hydrochloric acid. The solution was clarified by filtration and 220 cc. of water were added. Riboflavin monophosphoric acid ester crystallized. The slurry was allowed to stand for about 16 hours, and the yellow precipitate was then filtered off and washed with 30 cc. of normal hydrochloric acid, alcohol and ether and dried. The product thus obtained was the monophosphoric acid ester of riboflavin.

EXAMPLE 8

To 114.5 g. (0.4 mole) of phosphorus oxybromide, 14.4 cc. (0.8 mole) of water were slowly added with stirring and cooling to room temperature. Hydrogen bromide was evolved. Stirring was continued for 90 minutes and the solution was allowed to stand about 20 hours to complete the reaction. 7.52 g. (0.02 mole) of riboflavin were added to the solution with stirring. After 90 minutes, 500 cc. of isopropyl ether were added with stirring and cooling to about room temperature. The resulting precipitate was filtered, washed well with isopropyl ether and dried in vacuo. The resulting brown solid was dissolved in 15 cc. of concentrated hydrochloric acid and 90 cc. of water were added to the solution. Precipitation started and the mixture was allowed to stand for about 20 hours. The product was then filtered off, washed with 30 cc. of normal hydrochloric acid, ethyl alcohol and ether, and dried. The product thus obtained was monophosphoric acid ester of riboflavin.

EXAMPLE 9

As a further illustration of a phosphorylating procedure, the following is set forth. 61.3 g. (0.4 mole) phosphorus oxychloride were added slowly to 19.6 g. (0.2 mole) of orthophosphoric acid with agitation and cooling to room temperature. To the mixture, after standing overnight, 7.52 g. of riboflavin were added with stirring. Solution occurred after a short time. The reaction was allowed to proceed for 8 hours at room temperature. The clear red solution was then poured into 150 cc. of water and the temperature of the solution was allowed to rise to about 100° C. After about 15 minutes, the solution was cooled to about 20° C. by means of an ice bath and partially neutralized to a pH of 0.5 by the dropwise addition of 69 cc. of 50 per cent sodium hydroxide. Upon standing, riboflavin monophosphoric acid ester began to crystallize out. After 2 days, the product was filtered, washed, and dried. The crude dry substance was dissolved in concentrated hydrochloric acid and re-precipitated by the addition of 5 volumes of water. The properties of the riboflavin monophosphoric acid ester thus produced corresponded to those of the product prepared by Example 2.

As noted herein, the riboflavin monophosphoric acid ester may be treated to produce salts thereof. Of particular interest are such salts as the monosodium salt of riboflavin monophosphoric acid ester and monodiethanolamine salt of riboflavin monophosphoric acid ester, and hydrates thereof. These salts are highly water-soluble and of particular value for the preparation of parenteral solutions as well as other riboflavin-containing compositions. Diethanolamine salts of riboflavin monophosphoric acid ester and the hydrates thereof are disclosed and claimed in our application Serial No. 194,734, filed November 8, 1950. An illustrative method of preparing the monosodium salt of riboflavin monophosphoric acid ester is given as follows:

*Preparation of monosodium salt of riboflavin monophosphoric acid ester*

4.56 g. of riboflavin monophosphoric acid ester are suspended in about 100 cc. of water and the pH brought to 4.5 by addition of one or two normal sodium hydroxide. Practically all of the ester will dissolve upon continued stirring and crushing of the gelled portions. Opalescence, if present, may be removed by filtration through a fine sintered glass filter. The solution may also be clarified by addition of a small amount of niacinamide or gentisic acid ethanolamide or by bringing the pH to 9 by addition of NaOH followed by addition of glacial acetic acid to pH 4.5. Having obtained a clear solution at pH 4.5, about five volumes of ethanol are added, resulting in the precipitation of the monosodium salt of riboflavin monophosphoric acid ester. This is filtered off, washed with ethanol and ether and dried in vacuo at 50° C. The product is a yellow powder weighing about 4 g. It gives a clear aqueous solution at a concentration of 25 mg./cc.

We claim:

1. A process of phosphorylating riboflavin which comprises reacting riboflavin with a member selected from the group consisting of the acids represented by the formulae $(HO)_2POX$ and $HOPOX_2$, wherein X is a halogen selected from the group consisting of chlorine, bromine, and fluorine.

2. A halogen-containing product produced according to the process of claim 1.

3. A process of phosphorylating riboflavin which comprises reacting riboflavin with the acid represented by the formula $(HO)_2POCl$.

4. A chlorine-containing product produced according to the process of claim 3.

5. A process of phosphorylating riboflavin which comprises reacting riboflavin with the acid represented by the formula $HOPOCl_2$.

6. A chlorine-containing product produced according to the process of claim 5.

7. A process of phosphorylating riboflavin which comprises reacting riboflavin with the acid represented by the formula $(HO)_2POBr$.

8. A bromine-containing product produced according to the process of claim 7.

9. A process of phosphorylating riboflavin which comprises reacting riboflavin with the acid represented by the formula $HOPOBr_2$.

10. A bromine-containing product produced according to the process of claim 9.

11. A process of phosphorylating riboflavin which comprises reacting riboflavin with the acid represented by the formula $(HO)_2POF$.

12. A fluorine-containing product produced according to the process of claim 11.

13. A process of phosphorylating riboflavin which comprises reacting riboflavin with a member selected from the group consisting of the acids represented by the formulae $(HO)_2POX$ and $HOPOX_2$, and hydrolyzing the reaction product to produce riboflavin - 5' - monophosphoric acid ester, wherein X is a halogen selected from the group consisting of chlorine, bromine, and fluorine.

14. A process of phosphorylating riboflavin which comprises reacting riboflavin with the acid represented by the formula $(HO)_2POCl$, and hydrolyzing the reaction product to produce riboflavin-5'-monophosphoric acid ester.

15. A process of phosphorylating riboflavin which comprises reacting riboflavin with the acid represented by the formula $HOPOCl_2$, and hydrolyzing the reaction product to produce riboflavin-5'-monophosphoric acid ester.

16. A process of phosphorylating riboflavin which comprises reacting riboflavin with the acid represented by the formula $(HO)_2POBr$, and hydrolyzing the reaction product to produce riboflavin-5'-monophosphoric acid ester.

17. A process of phosphorylating riboflavin which comprises reacting riboflavin with the acid represented by the formula $HOPOBr_2$, and hydrolyzing the reaction product to produce riboflavin-5'-monophosphoric acid ester.

18. A process of phosphorylating riboflavin which comprises reacting riboflavin with the acid represented by the formula $(HO)_2POF$, and hydrolyzing the reaction product to produce riboflavin-5'-monophosphoric acid ester.

LEO A. FLEXSER.
WALTER G. FARKAS.

REFERENCES CITED

The following references are of record in the file of this patent:

UNITED STATES PATENTS

| Number | Name | Date |
|---|---|---|
| 2,024,036 | Funaoka | Dec. 10, 1935 |
| 2,111,491 | Kuhn | Mar. 15, 1938 |
| 2,535,385 | Breivogel | Dec. 26, 1950 |

FOREIGN PATENTS

| Number | Country | Date |
|---|---|---|
| 191,340 | Switzerland | Aug. 16, 1937 |